(12) United States Patent
Kim

(10) Patent No.: US 9,834,115 B2
(45) Date of Patent: Dec. 5, 2017

(54) COASTING TORQUE CONTROL SYSTEM OF VEHICLE AND METHOD USING THE SAME

(71) Applicant: Hyundai Motor Company, Seoul (KR)

(72) Inventor: Sang Joon Kim, Seoul (KR)

(73) Assignee: Hyundai Motor Company, Seoul (KR)

( * ) Notice: Subject to any disclaimer, the term of this patent is extended or adjusted under 35 U.S.C. 154(b) by 101 days.

(21) Appl. No.: 14/948,647

(22) Filed: Nov. 23, 2015

(65) Prior Publication Data

US 2017/0015211 A1    Jan. 19, 2017

(30) Foreign Application Priority Data

Jul. 13, 2015    (KR) .................... 10-2015-0099199

(51) Int. Cl.
*B60L 15/20*    (2006.01)

(52) U.S. Cl.
CPC .......... *B60L 15/20* (2013.01); *B60L 2240/12* (2013.01); *B60L 2240/423* (2013.01); *B60L 2240/64* (2013.01); *B60L 2240/68* (2013.01); *B60L 2260/24* (2013.01); *Y02T 10/7258* (2013.01); *Y02T 10/76* (2013.01)

(58) Field of Classification Search
None
See application file for complete search history.

(56) References Cited

U.S. PATENT DOCUMENTS

| | | | | |
|---|---|---|---|---|
| 4,526,065 A * | 7/1985 | Rosen | ............... | F16H 61/0267 477/100 |
| 5,435,795 A * | 7/1995 | Mochizuki | ............ | B60W 10/02 477/39 |
| 5,915,801 A * | 6/1999 | Taga | ....................... | B60K 6/48 303/152 |
| 6,122,587 A * | 9/2000 | Takahara | ............... | B60K 6/387 180/65.23 |
| 6,246,945 B1 * | 6/2001 | Fritz | ................. | B60W 30/1819 303/112 |
| 6,311,122 B1 * | 10/2001 | Higashimata | ...... | B60K 31/0008 180/179 |
| 9,026,296 B1 * | 5/2015 | Johri | .................... | B60W 20/10 701/22 |
| 2009/0012690 A1 * | 1/2009 | Trotter | ...................... | B60T 7/12 701/83 |
| 2014/0148983 A1 * | 5/2014 | Kim | ...................... | B60W 20/14 701/22 |

(Continued)

FOREIGN PATENT DOCUMENTS

| | | |
|---|---|---|
| JP | H118909 A | 1/1999 |
| JP | 2002-305806 A | 10/2002 |

(Continued)

*Primary Examiner* — Russell Frejd
(74) *Attorney, Agent, or Firm* — Mintz Levin Cohn Ferris Glovsky and Popeo, P.C.; Peter F. Corless

(57) ABSTRACT

A coasting torque control method of a vehicle includes: determining whether external information is received; when the external information is received, acquiring one or more pieces of speed information about a road on which the vehicle is currently driving based on the received external information; selecting a coasting torque based on the acquired speed information; and controlling a drive motor coupled to a drive shaft of the vehicle based on the selected coasting torque.

13 Claims, 3 Drawing Sheets

(56) References Cited

U.S. PATENT DOCUMENTS

2014/0172211 A1* 6/2014 Kim .................... B60L 15/2009
　　　　　　　　　　　　　　　　　　　　　701/22
2015/0134159 A1* 5/2015 Johri .................... B60W 20/10
　　　　　　　　　　　　　　　　　　　　　701/22
2016/0290502 A1* 10/2016 Yamanaka ............... B60K 6/48

FOREIGN PATENT DOCUMENTS

| | | |
|---|---|---|
| JP | 2007-306956 A | 11/2007 |
| JP | 5427031 B2 | 2/2014 |
| JP | 5668761 B2 | 2/2015 |
| KR | 10-1427947 B1 | 8/2014 |

* cited by examiner

COASTING TORQUE CONTROL SYSTEM OF VEHICLE AND METHOD USING THE SAME

CROSS-REFERENCE TO RELATED APPLICATION

This application claims priority to and the benefit of Korean Patent Application No. 10-2015-0099199 filed in the Korean Intellectual Property Office on Jul. 13, 2015, wherein the entire contents of which are incorporated herein by reference.

BACKGROUND OF THE DISCLOSURE (a) Technical Field

The present disclosure relates generally to a control system of a vehicle and a control method thereof, and more particularly, to a control system of a vehicle and a control method thereof for energy recovery.

(b) Description of the Related Art

An electrically powered vehicle refers to a vehicle in which a drive motor receives power supplied from a battery and then produces driving torque using the supplied power. Examples of electrically powered vehicles include an electric vehicle in which all driving torque is produced by a drive motor, and a hybrid vehicle in which some of the driving torque is produced by a drive motor.

Generally, when coasting due to inertia, the electrically powered vehicle operates the drive motor as a generator so as to retrieve inertia energy, and charges the power produced from the drive motor to a battery. That is, the electrically powered vehicle allows power to be recovered from inertia energy by setting coasting torque (i.e., negative torque) associated with a vehicle speed to the drive motor when coasting. However, since the coasting torque does not reflect road conditions under which the vehicle is driven, energy recovery efficiency of the coasting system may deteriorate.

The above information disclosed in this Background section is only to enhance the understanding of the background of the disclosure, and therefore, it may contain information that does not form the related art that is already known in this country to a person of ordinary skill in the art.

SUMMARY OF THE DISCLOSURE

The present disclosure has been made in an effort to provide a coasting torque control system of a vehicle that can receive external information and apply coasting torque of a drive motor based on the external information, and a control method using the same.

A coasting torque control method of a vehicle according to embodiments of the present disclosure includes: determining whether external information is received; when the external information is received, acquiring one or more pieces of speed information about a road on which the vehicle is currently driving based on the received external information; selecting a coasting torque based on the acquired speed information; and controlling a drive motor coupled to a drive shaft of the vehicle based on the selected coasting torque.

Selecting the coasting torque may include assigning priorities to the one or more pieces of speed information; and selecting the coasting torque based on a piece of speed information having a higher priority than at least one other piece of speed information.

The control method may further include acquiring additional speed information about the road on which the vehicle is currently driving based on information other than the external information.

The speed information based on the external information may have a higher priority than the speed information based on information other than the external information.

The speed information based on information other than the external information may be calculated based on a driving speed of the vehicle.

The speed information may include road information about a type of the road on which the vehicle is currently driving and traffic information about an average speed of the road on which the vehicle is currently driving, and information among the road information and the traffic information indicating a lower average speed of may be assigned a higher priority than information indicating a higher average speed.

The road information may include information about whether the road on which the vehicle is currently driving is an expressway, a national highway, a backroad, a downtown road, or a school zone road.

The traffic information may include information about whether the traffic on the road on which the vehicle is currently driving is smooth, slow, or congested.

When speed information having a high priority cannot be acquired from the one or more pieces of speed information, the coasting torque may be selected based on speed information having a next highest priority.

The selecting of the coasting torque may include selecting the coasting torque based on a coasting torque map in which the one or more pieces of speed information and a current speed of the vehicle are respectively matched with a plurality of coasting torques.

The control method may further include acquiring the speed information based on a driving speed of the vehicle when the external information cannot be received.

Furthermore, according to embodiments of the present disclosure, a coasting torque control system of a vehicle includes: an external information receiver receiving external information including one or more pieces of speed information about a road on which a vehicle is currently driving; a coasting torque controller receiving the external information from the external information receiver and selecting a coasting torque based on the received speed information; and a drive motor coupled to a battery of the vehicle producing recovery power using the coasting torque selected by the coasting torque controller when the vehicle is coasting and transmitting the produced recovery power to a battery power supply.

The coasting torque controller may calculate additional speed information about the road on which the vehicle is currently driving based on information other than the external information.

The coasting torque controller may include a coasting torque map in which of the one or more pieces of speed information and a current speed of the vehicle are respectively matched with a plurality of coasting torques.

Furthermore, according to embodiments of the present disclosure, a non-transitory computer readable medium containing program instructions for performing a coasting torque control method of a vehicle includes: program instructions that determine whether external information is received; program instructions that, when the external information is received, acquire one or more pieces of speed information about a road on which the vehicle is currently driving based on the received external information; program instructions that select a coasting torque based on the acquired speed information; and program instructions that control a drive motor coupled to a drive shaft of the vehicle based on the selected coasting torque.

As described above, in the coasting torque control system of the vehicle according to embodiments of the present disclosure and the control method using the same, since the coasting torque is set according to road conditions under which the vehicle is driving, energy recovery efficiency can be enhanced.

DETAILED DESCRIPTION OF THE EMBODIMENTS

Figure 1:
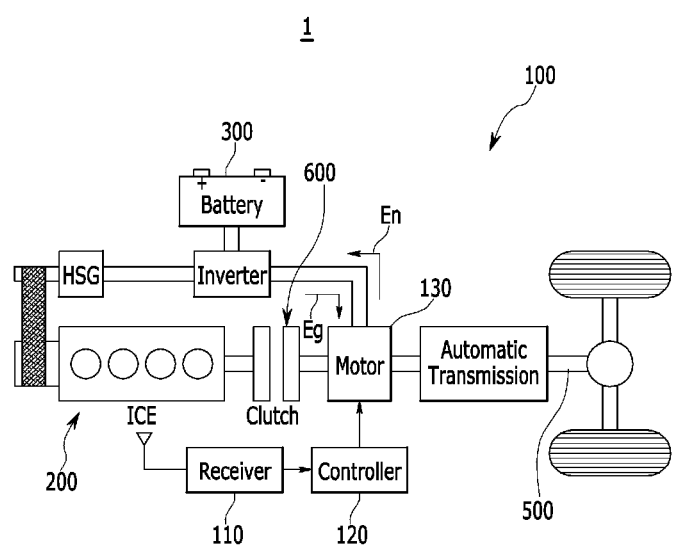
FIG. 1 is a block diagram of a configuration of a coasting torque control system of a vehicle according to embodiments of the present disclosure.

The present disclosure will be described more fully hereinafter with reference to the accompanying drawings, in which embodiments of the disclosure are shown. As those skilled in the art would realize, the described embodiments may be modified in various different ways, all without departing from the spirit or scope of the present disclosure. The drawings and description are to be regarded as illustrative in nature and not restrictive. Like reference numerals designate like elements throughout the specification. Further, in the drawings, size and thickness of each element are arbitrarily illustrated for ease of description, and the present disclosure is not necessarily limited to such size and thickness illustrated in the drawings.

The term "on" as used in the present disclosure means that one element is disposed above or below a target element, but does not necessarily mean that one element is not disposed thereabove based on the direction of gravity. In addition, throughout the specification, unless explicitly described to the contrary, the word "comprise" and variations such as "comprises" or "comprising" will be understood to imply the inclusion of stated elements but not the exclusion of any other elements. As used herein, the singular forms "a", an and the are intended to include the plural forms as well, unless the context clearly indicates otherwise.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Additionally, it is understood that one or more of the below methods, or aspects thereof, may be executed by at least one controller. The term "controller" may refer to a hardware device that includes a memory and a processor. The memory is configured to store program instructions, and the processor is specifically programmed to execute the program instructions to perform one or more processes which are described further below. Moreover, it is understood that the below methods may be executed by an apparatus comprising the controller in conjunction with one or more other components, as would be appreciated by a person of ordinary skill in the art.

Furthermore, the controller of the present disclosure may be embodied as non-transitory computer readable media on a computer readable medium containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

A control method of a vehicle according to embodiments of the present disclosure will now be described in detail with reference to the drawings.

FIG. 1 is a block diagram of a configuration of a coasting torque control system of a vehicle according to embodiments of the present disclosure.

As shown in FIG. 1, a vehicle 1 equipped with a vehicle control system 100 according to embodiments of the present disclosure generates driving torque in an internal combustion engine 200 and a drive motor 130, and a drive shaft 500 and the internal combustion engine 200 are selectively coupled by a clutch 600. The drive motor 130 receives driving power Eg from a battery 300 via an inverter 400, and generates the driving torque.

The vehicle 1 equipped with the vehicle control system 100 according to embodiments of the present disclosure is described to include the internal combustion engine 200 and drive motor 130, but the coasting torque control system 100 of the vehicle according to embodiments of the present disclosure can be applied to a vehicle in which only a drive motor 130 is equipped to generate driving torque without having an internal combustion engine 200.

The coasting torque control system 100 is a system in which power is generated using the driving torque of the vehicle 1 while the vehicle 1 is coasting. The coasting torque control system 100 selects coasting torque based on speed information about a driving road on which the vehicle 1 is currently driven, and controls the drive motor 130 to produce power based on the coasting torque.

The coasting torque control system 100 includes an external information receiver 110, a coasting torque controller 120, and the drive motor 130.

The external information receiver 110 receives external information including one or more pieces of speed information about the driving road on which the vehicle 1 is currently driving.

In this case, speed information about the driving road may include road information about a kind of the driving road, and traffic information about an average speed of the driving road. The road information may be information about a current position of the vehicle. That is, the road information includes information about whether the road on which the vehicle is driven is an expressway, a national highway, a backroad, a downtown road, or a school zone road. Further, the traffic information includes information about whether the traffic on the road on which the vehicle is driven is smooth, slow, or congested.

The external information receiver 110 receives the external information from a transmitter or a repeater installed outside, and for example, may receive the external information from the outside via wireless communication networks including long-term evolution (LTE), wideband code division multiple access (WCDMA), and the like. The wireless communication networks are exemplarily described, and a configuration in which the external information receiver 110 receives the external information via communication networks other than the wireless communication networks that are exemplarily described is also included in embodiments of the present disclosure.

The coasting torque controller 120 receives the external information from the external information receiver 110, and selects the coasting torque T based on the speed information about the driving road.

In addition, when the external information receiver 110 cannot receive the external information as in a shadow region, the coasting torque controller 120 may acquire the speed information about the driving road based not on the external information but on the current driving speed of the vehicle 1.

The coasting torque controller 120 may include a coasting torque map in which the plurality of pieces of speed information about the driving road and the coasting torques are respectively matched.

The drive motor 130 is connected to the battery 300 to operate, and is connected to the drive shaft 500 to provide the driving torque to the vehicle 1.

In addition, when the vehicle 1 is coasting, the drive motor 130 is set to the coasting torque that is selected by the coasting torque controller 120, and produces recovery power Er by using the inertia force of the vehicle 1 transmitted via the drive shaft 500. The produced recovery power Er is transmitted to the battery 300 from the drive motor 130 via the inverter 400.

In this case, as the coasting torque increases, the drive motor 130 produces more recovery power Er and the speed of the vehicle more quickly decreases.

A process of selecting the coasting torque T based on an average speed of the driving road by the coasting torque controller 120 will now be described in detail.

Figure 2:
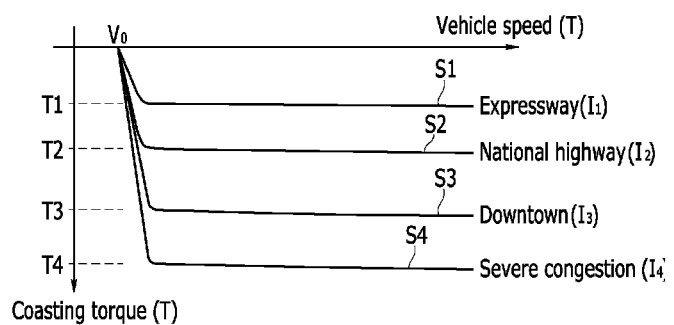
FIG. 2 illustrates coasting torque selected by the coasting torque control system of FIG. 1 based on an average speed of the driving road.

FIG. 2 illustrates the coasting torque selected by the coasting torque control system of FIG. 1 based on the average speed of the driving road.

As shown in FIG. 2, the coasting torque T based on three kinds of the road information and one kind of the traffic information from the external information is illustrated as an example.

The coasting torque T represents a negative torque, and represents larger torque as a negative value increases in the graph. When the coasting torque T is set to the drive motor 130, the vehicle 1 is decelerated by the coasting torque T which is the negative torque.

Hereinafter, a direction in which an absolute value of the coasting torque T increases will be described as a torque increasing direction, while a direction in which an absolute value of the coasting torque T decreases will be described as a torque decreasing direction.

Specifically, the external information includes first information 11, second information 12, third information 13, and fourth information 14. For example, the first, second, and third information 11, 12, and 13 are the road information that respectively represent an expressway, a national highway, and a downtown road, and the fourth information 14 is the traffic information that represents severe congestion.

In this case, an average speed of the driving road of the first information 11 is the greatest, followed by that of the second information 12, then followed by that of the third information 13, and an average speed of the driving road of the fourth information 14 is the smallest.

First to fourth torque curves S1 to S4 are formed in accordance with the average speeds of the driving roads of the first to fourth information 11 to 14.

The first to fourth torque curves S1 to S4 start at a point where a speed of the coasting torque vehicle 1 is a reference speed V0, and gradually increase as the speed of the vehicle 1 increases such that they respectively converge to the first to fourth torques T1 to T4.

In this case, the first torque T1 is the smallest, the amount of torque increases from the second torque T2 to the third torque T3, and the fourth torque T4 is the largest.

That is, the coasting torque when the vehicle 1 is driven on the expressway is set to the first torque T1, the speed of the vehicle 1 is less reduced and less recovery power Er is produced, as compared to when set to the third torque T3, which is the coasting torque when the vehicle 1 is driven on the downtown road.

On the contrary, when driven in an extremely congested situation, the vehicle 1 is set to the fourth torque T4, which is the largest coasting torque, and the speed of the vehicle 1 is least reduced and the highest recovery power Er is produced.

In addition, the coasting torque controller 120 may include the coasting torque map in which the coasting torques are matched based on the vehicle speed V and the speed information about the driving road in accordance with a plurality of torque curves such as the first to fourth torque curves S1 to S4.

A process in which the vehicle 1 is controlled by the coasting torque control system 100 of the vehicle according to the current exemplary embodiment will now be described in detail.

Figure 3:
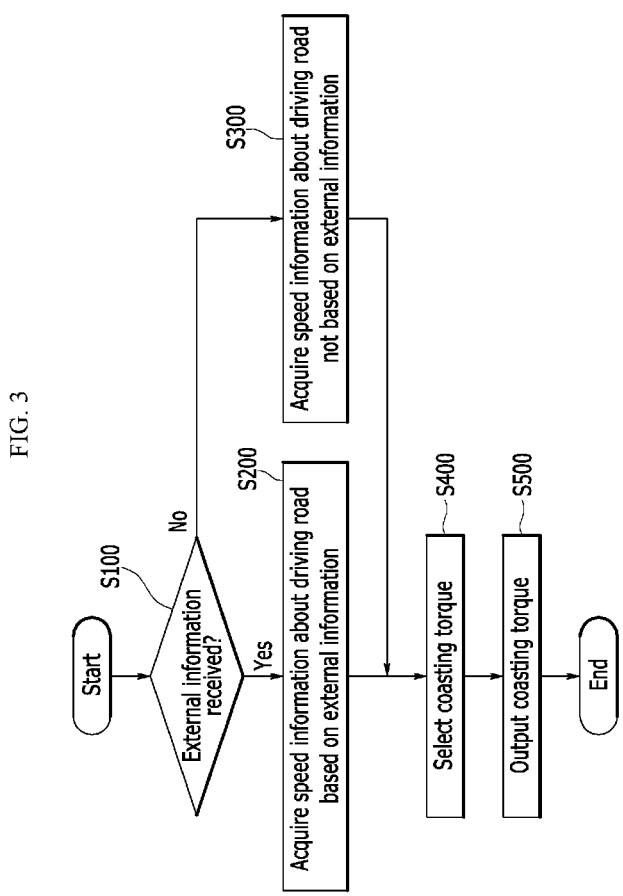
FIG. 3 is a flowchart of a coasting torque control method of a vehicle of FIG. 1.

FIG. 3 is a flowchart of a coasting torque control method of the vehicle of FIG. 1.

As shown in FIG. 3, a coasting torque controller 120 determines whether external information is received or not (S100), and when the external information is received, it acquires at least one or more pieces of speed information about a driving road on which the vehicle is currently driven based on the external information (S200).

In addition, when the external information is not received such as when the vehicle 1 is driven in a shadow region in which the external information cannot be received or when the external information receiver 110 is not present or does not normally operate, the coasting torque controller 120 acquires the speed information about the driving road not based on the external information.

In this case, the speed information about the driving road may be calculated based on a driving speed of the vehicle 1.

Next, the coasting torque controller 120 selects coasting torque T based on the acquired speed information about the driving road (S400).

The coasting torque T may be selected based on a coasting torque map in which the acquired speed information about the driving road and the current speed of the vehicle 1 are matched with the coasting torque T.

In this case, when the plurality of pieces of speed information about the driving road are available at the same time, that is, when the road information and the traffic information for acquiring the plurality of pieces of speed information about the driving road are simultaneously received, the information having a lower average speed has a higher priority.

For example, when the vehicle 1 is driven on an expressway in an extremely congested situation, the coasting torque control system 100 receives the road information about the expressway and the traffic information about the extremely congested situation.

Next, the coasting torque controller 120 acquires one of two pieces of external information having a low average driving speed, i.e., speed information about the driving road associated with the traffic information about the extremely congested situation, and based on the acquired information, selects the coasting torque T from the coasting torque driving map.

Next, the coasting torque controller 120 controls the drive motor 130 based on the selected coasting torque T (S500), thereby producing recovery power Er associated with inertia force of the vehicle 1.

In embodiments of the present disclosure, when the external information cannot be received, the average speed of the driving road not based on the external information is instead acquired, but a configuration in which the average speed of the driving road not based on the external information is acquired regardless of whether the external information is received or not may also be included in embodiments of the present disclosure.

In this case, the coasting torque controller 120 may select the coasting torque T by assigning a higher priority on the average speed of the driving road based on the external information, rather than the average speed of the driving road not based on the external information.

As described above, in accordance with the vehicle control system and the method using the same according to embodiments of the present disclosure, since the coasting torque is set by reflecting road conditions under which the vehicle is driven, energy recovery efficiency can be enhanced.

While this disclosure has been described in connection with what is presently considered to be practical embodiments, it is to be understood that the disclosure is not limited to the disclosed embodiments, but, on the contrary, is intended to cover various modifications and equivalent arrangements included within the spirit and scope of the appended claims.

| <Description of Symbols> | |
|---|---|
| 1: vehicle | 100: vehicle control system |
| 110: external information receiver | 120: controller |
| 130: drive motor | 200: internal combustion engine |
| 300: battery | 400: inverter |
| 500: drive shaft | 600: clutch |

What is claimed is:

1. A coasting torque control method of a vehicle, the method comprising:
   determining whether external information is received;
   when the external information is received, acquiring one or more pieces of speed information about a road on which the vehicle is currently driving based on the received external information;
   selecting a coasting torque based on the acquired speed information, wherein selecting the coasting torque further comprises:
      assigning priorities to the one or more pieces of speed information; and
      selecting the coasting torque based on a piece of speed information having a higher priority than at least one other piece of speed information; and
   controlling a drive motor coupled to a drive shaft of the vehicle based on the selected coasting torque, wherein:
      the speed information includes road information about a type of the road on which the vehicle is currently driving and traffic information about an average speed of the road on which the vehicle is currently driving, and
      information among the road information and the traffic information indicating a lower average speed is assigned a higher priority than information indicating a higher average speed.

2. The method of claim 1, further comprising:
   acquiring additional speed information about the road on which the vehicle is currently driving based on information other than the external information.

3. The method of claim 2, wherein the speed information based on the external information has a higher priority than the speed information based on information other than the external information.

4. The method of claim 2, wherein the speed information based on information other than the external information is calculated based on a driving speed of the vehicle.

5. The method of claim 1, wherein the road information includes information about whether the road on which the vehicle is currently driving is an expressway, a national highway, a backroad, a downtown road, or a school zone road.

6. The method of claim 1, wherein the traffic information includes information about whether the traffic on the road on which the vehicle is currently driving is smooth, slow, or congested.

7. The method of claim 1, wherein the selecting of the coasting torque comprises:
   selecting the coasting torque based on a coasting torque map in which the one or more pieces of speed information and a current speed of the vehicle are respectively matched with a plurality of coasting torques.

8. A coasting torque control method of a vehicle, the method comprising:
   determining whether external information is received;
   when the external information is received, acquiring one or more pieces of speed information about a road on which the vehicle is currently driving based on the received external information;
   selecting a coasting torque based on the acquired speed information, wherein selecting the coasting torque further comprises:
      assigning priorities to the one or more pieces of speed information; and
      selecting the coasting torque based on a piece of speed information having a higher priority than at least one other piece of speed information; and
   controlling a drive motor coupled to a drive shaft of the vehicle based on the selected coasting torque,
   wherein, when speed information having a high priority cannot be acquired from the one or more pieces of speed information, the coasting torque is selected based on speed information having a next highest priority.

9. A coasting torque control method of a vehicle, the method comprising:
   determining whether external information is received;
   when the external information is received, acquiring one or more pieces of speed information about a road on which the vehicle is currently driving based on the received external information;
   selecting a coasting torque based on the acquired speed information;
   controlling a drive motor coupled to a drive shaft of the vehicle based on the selected coasting torque; and acquiring the speed information based on a driving speed of the vehicle when the external information cannot be received.

10. A coasting torque control system of a vehicle, the system comprising:
- an external information receiver receiving external information including one or more pieces of speed information about a road on which a vehicle is currently driving;
- a coasting torque controller receiving the external information from the external information receiver, assigning priorities to the one or more pieces of speed information, and selecting a coasting torque based on a piece of speed information having a higher priority than at least one other piece of speed information; and
- a drive motor coupled to a battery of the vehicle producing recovery power using the coasting torque selected by the coasting torque controller when the vehicle is coasting and transmitting the produced recovery power to a battery power supply, wherein:
- the speed information includes road information about a type of the road on which the vehicle is currently driving and traffic information about an average speed of the road on which the vehicle is currently driving, and
- information among the road information and the traffic information indicating a lower average speed is assigned a higher priority than information indicating a higher average speed.

11. The system of claim 10, wherein the coasting torque controller calculates additional speed information about the road on which the vehicle is currently driving based on information other than the external information.

12. The system of claim 10, wherein the coasting torque controller includes a coasting torque map in which of the one or more pieces of speed information and a current speed of the vehicle are respectively matched with a plurality of coasting torques.

13. A non-transitory computer readable medium containing program instructions for performing a coasting torque control method of a vehicle, the computer readable medium comprising:
- program instructions that determine whether external information is received;
- program instructions that, when the external information is received, acquire one or more pieces of speed information about a road on which the vehicle is currently driving based on the received external information;
- program instructions that select a coasting torque based on the acquired speed information, including assigning priorities to the one or more pieces of speed information and selecting the coasting torque based on a piece of speed information having a higher priority than at least one other piece of speed information; and
- program instructions that control a drive motor coupled to a drive shaft of the vehicle based on the selected coasting torque, wherein:
- the speed information includes road information about a type of the road on which the vehicle is currently driving and traffic information about an average speed of the road on which the vehicle is currently driving, and
- information among the road information and the traffic information indicating a lower average speed is assigned a higher priority than information indicating a higher average speed.

* * * * *